US010382137B2

(12) United States Patent
Maggi et al.

(10) Patent No.: US 10,382,137 B2
(45) Date of Patent: Aug. 13, 2019

(54) OPTOELECTRONIC DEVICE HAVING IMPROVED OPTICAL COUPLING

(71) Applicant: STMicroelectronics S.r.l., Agrate Brianza (IT)

(72) Inventors: Luca Maggi, Garlate (IT); Antonio Fincato, Cameri (IT); Salvatore Mario Rotolo, Milan (IT); Matteo Alessio Traldi, Milan (IT); Luigi Verga, Bregnano (IT); Mark Andrew Shaw, Milan (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 16/014,932

(22) Filed: Jun. 21, 2018

(65) Prior Publication Data

US 2018/0302166 A1   Oct. 18, 2018

Related U.S. Application Data

(63) Continuation of application No. 14/282,394, filed on May 20, 2014, now Pat. No. 10,033,464.

(30) Foreign Application Priority Data

May 28, 2013   (IT) .............................. MI2013A0864

(51) Int. Cl.
*G02B 6/36* (2006.01)
*H04B 10/114* (2013.01)
(Continued)

(52) U.S. Cl.
CPC .............. *H04B 10/40* (2013.01); *G02B 6/42* (2013.01); *G02B 6/4214* (2013.01); *H04B 10/80* (2013.01);
(Continued)

(58) Field of Classification Search
CPC ...... H04B 10/40; H04B 10/2575; G02B 6/42; G02B 6/4214; G02B 6/4206;
(Continued)

(56) References Cited

U.S. PATENT DOCUMENTS 5,168,537 A   12/1992   Rajasekharan et al.
5,515,468 A    5/1996   DeAndrea et al.
(Continued)

FOREIGN PATENT DOCUMENTS

DE   3706255 A1   9/1988
EP   1542291      6/2005
(Continued)

OTHER PUBLICATIONS

Park et al., "Passively Aligned Transmit Optical Subassembly Module Based on a WDM Incorporating VCSELs," IEEE Photonics Technology Letters, vol. 22, No. 24, Dec. 15, 2010, pp. 1790-1792.

*Primary Examiner* — Abbas H Alagheband
(74) *Attorney, Agent, or Firm* — Slater Matsil, LLP

(57) ABSTRACT

An optoelectronic device may include a package having a component for sending/receiving optical signals along a first direction, and a chip of semiconductor material housed within the package. The chip may have a main surface and a portion exposed on the main surface for sending/receiving the optical signals along a second direction different from the first direction. The optoelectronic device may further include a component for deflecting the optical signals between the first direction and the second direction, the component being mounted on the main surface.

21 Claims, 12 Drawing Sheets

(51) Int. Cl.
*H04J 14/02* (2006.01)
*H04B 10/40* (2013.01)
*G02B 6/42* (2006.01)
*H04B 10/80* (2013.01)
*H04B 10/2575* (2013.01)

(52) U.S. Cl.
CPC .............. *G02B 6/36* (2013.01); *G02B 6/4206* (2013.01); *G02B 6/4246* (2013.01); *G02B 6/4292* (2013.01); *H04B 10/1143* (2013.01); *H04B 10/2575* (2013.01); *H04J 14/0209* (2013.01); *Y10T 29/49002* (2015.01)

(58) Field of Classification Search
CPC ...... G02B 6/4246; G02B 6/4292; G02B 6/36; G02B 6/12; Y10T 29/49002
USPC ........................................................ 398/115
See application file for complete search history.

(56) References Cited

U.S. PATENT DOCUMENTS

| | | | |
|---|---|---|---|
| 6,004,046 A | 12/1999 | Sawada | |
| 6,213,650 B1* | 4/2001 | Moriyama | G02B 6/4214 385/88 |
| 6,454,470 B1* | 9/2002 | Dwarkin | G02B 6/4214 385/31 |
| 6,775,077 B1* | 8/2004 | Feng | G06K 7/10702 235/462.32 |
| 6,992,846 B2* | 1/2006 | Feng | G06K 7/10702 235/462.32 |
| 7,044,658 B1 | 5/2006 | Grung et al. | |
| 7,106,980 B2 | 9/2006 | Nakanishi et al. | |
| 7,121,738 B2 | 10/2006 | Baur | |
| 7,181,144 B1* | 2/2007 | Hamilton | H04B 10/1143 398/128 |
| 7,331,723 B2 | 2/2008 | Yoon et al. | |
| 7,369,776 B2 | 5/2008 | Masahiko | |
| 7,371,014 B2* | 5/2008 | Willis | G02B 6/3887 385/24 |
| 8,380,075 B2 | 2/2013 | Sakigawa et al. | |
| 2002/0080457 A1 | 6/2002 | Nakanishi et al. | |
| 2003/0044134 A1* | 3/2003 | Strachan | G02B 6/4204 385/93 |
| 2003/0063873 A1* | 4/2003 | Matsushima | G02B 6/4204 385/93 |
| 2004/0179784 A1* | 9/2004 | Vancoille | G02B 6/4214 385/47 |
| 2004/0234210 A1* | 11/2004 | Nagasaka | G02B 6/4214 385/88 |
| 2004/0246600 A1 | 12/2004 | Feng | |
| 2005/0025483 A1 | 2/2005 | Gurevich et al. | |
| 2005/0083568 A1* | 4/2005 | Nakae | B82Y 20/00 359/341.3 |
| 2005/0163435 A1* | 7/2005 | Fincato | G02B 6/4214 385/88 |
| 2005/0194607 A1* | 9/2005 | Barnett | F21V 19/0015 257/99 |
| 2006/0104576 A1* | 5/2006 | Nagasaka | G02B 6/32 385/93 |
| 2006/0239605 A1* | 10/2006 | Palen | G02B 6/4206 385/14 |
| 2006/0239612 A1 | 10/2006 | De Dobbelaere et al. | |
| 2007/0140628 A1* | 6/2007 | Ebbutt | G02B 6/3644 385/89 |
| 2009/0153949 A1* | 6/2009 | Kanemoto | G02B 6/4201 359/333 |
| 2009/0310905 A1 | 12/2009 | Riester et al. | |
| 2010/0098374 A1* | 4/2010 | Althaus | G02B 6/4214 385/14 |
| 2010/0171414 A1 | 7/2010 | Tanikawa et al. | |
| 2010/0209103 A1 | 8/2010 | Sakigawa et al. | |
| 2014/0139844 A1 | 5/2014 | Oigawa | |
| 2014/0308004 A1 | 10/2014 | Doany et al. | |
| 2016/0294155 A1* | 10/2016 | Zheng | H01S 5/0228 |
| 2016/0356971 A1* | 12/2016 | de Jong | G02B 6/4214 |
| 2016/0365928 A1 | 12/2016 | Xiao et al. | |
| 2017/0153400 A1 | 6/2017 | Kasai | |

FOREIGN PATENT DOCUMENTS

| | | |
|---|---|---|
| EP | 2581776 | 4/2013 |
| WO | 03077001 | 9/2003 |

\* cited by examiner

OPTOELECTRONIC DEVICE HAVING IMPROVED OPTICAL COUPLING

CROSS-REFERENCE TO RELATED APPLICATIONS

This application is a continuation application of U.S. application Ser. No. 14/282,394, filed on May 20, 2014, which claims the benefit of Italy Application No. MI2013A000864, filed on May 28, 2013 which applications are hereby incorporated herein by reference.

TECHNICAL FIELD

The present disclosure relates to the field of optoelectronic devices.

BACKGROUND

Optoelectronic devices are widely used in optical communication systems, where electrical signals containing information to be transmitted are modulated on corresponding optical signals. The optical signals are propagated between the optoelectronic devices through optical propagation channels (for example, optical fibers).

A typical optoelectronic device comprises a chip of semiconductor material with optical circuits integrated hereinafter OIC ("Optical Integrated Circuit") chip, for modulating/de-modulating the electrical/optical signals into the corresponding optical/electrical signals, respectively, a chip of semiconductor material where electronic circuits are integrated, hereinafter EIC ("Electrical Integrated Circuit") chip, for processing the electrical signals according to the specific functionality of the optoelectronic device, and optical components for transferring the optical signals to/from the OIC chip. The OIC chip generally comprises waveguides for propagating the optical signals among the optical circuits integrated therein, exposed regions (exposed on surfaces of the OIC chip) for sending/receiving the optical signals, and optical gratings for transferring the optical signals between the waveguides, where optical signal propagation takes place only along a longitudinal direction (i.e., parallel to a substrate of semiconductor material from which the OIC chip is formed). This may involve coupling difficulties between the OIC chip and the optical propagation channels.

Indeed, in the case of exposed regions being made on an upper surface of the OIC chip (so as to send/receive the optical signals along a transverse direction, perpendicular to the longitudinal direction), a vertical coupling between the optical propagation channel and the OIC chip may be needed. However, the vertical coupling may need structures for supporting the optical propagation channel, with a consequent increase of space occupation by the optoelectronic device. Moreover, in many implementations, the optical propagation channel is subject to non-negligible curvatures to achieve the vertical coupling. This may cause damage of the optical propagation channel, and/or propagation errors of the optical signals through it. Instead, in the case of exposed regions made on a side surface of the OIC chip (so as to send/receive the optical signals along the longitudinal direction), the production process of the OIC chip needs additional operations (for example, side surface lapping), and therefore an increase of the optoelectronic device costs.

For example, U.S. Patent Publication No. 2005/0163435 to Fincato discloses an optoelectronic device on a support substrate, and an optical component integrated within the substrate for coupling the optoelectronic device to an optical fiber. Some approaches, such as U.S. Patent Publication No. 2005/0163435 to Fincato, may include, in addition to what is discussed above, high manufacturing difficulties and reduced efficiency.

SUMMARY

An aspect is directed to an optoelectronic device comprising a package with a device for sending/receiving optical signals along a first direction, a chip housed within the package with a component exposed on a main surface thereof for sending/receiving the optical signals along a second direction different from the first direction, and a component, mounted on the main surface, for deflecting the optical signals between the first direction and the second direction. Another aspect is directed to a method for manufacturing such optoelectronic device.

DETAILED DESCRIPTION OF ILLUSTRATIVE EMBODIMENTS

Figure 1A:
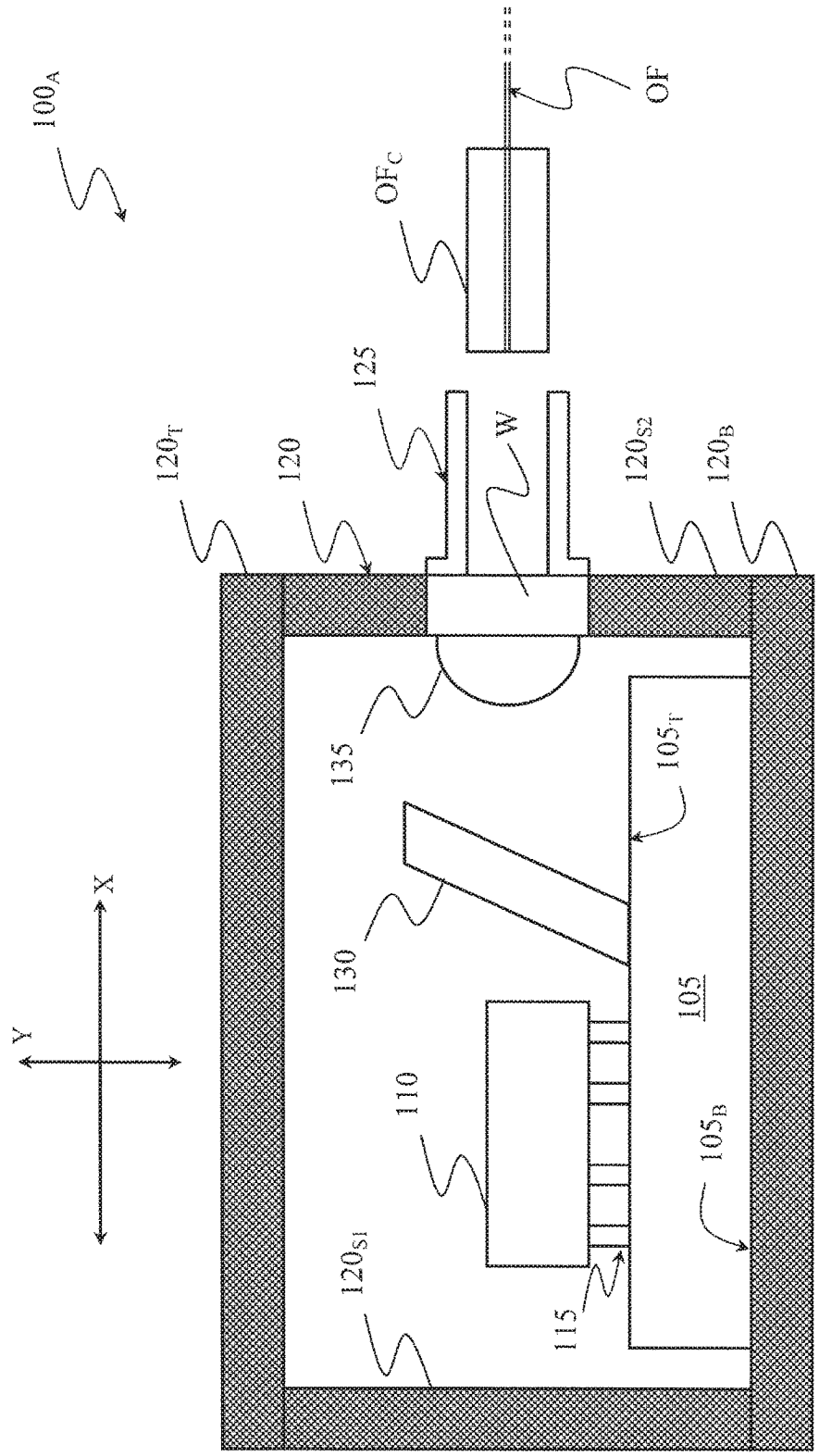
FIGS. 1A-6 are schematic diagrams of sectional views of an optoelectronic device, according to embodiments of the present disclosure.
Figure 1B:
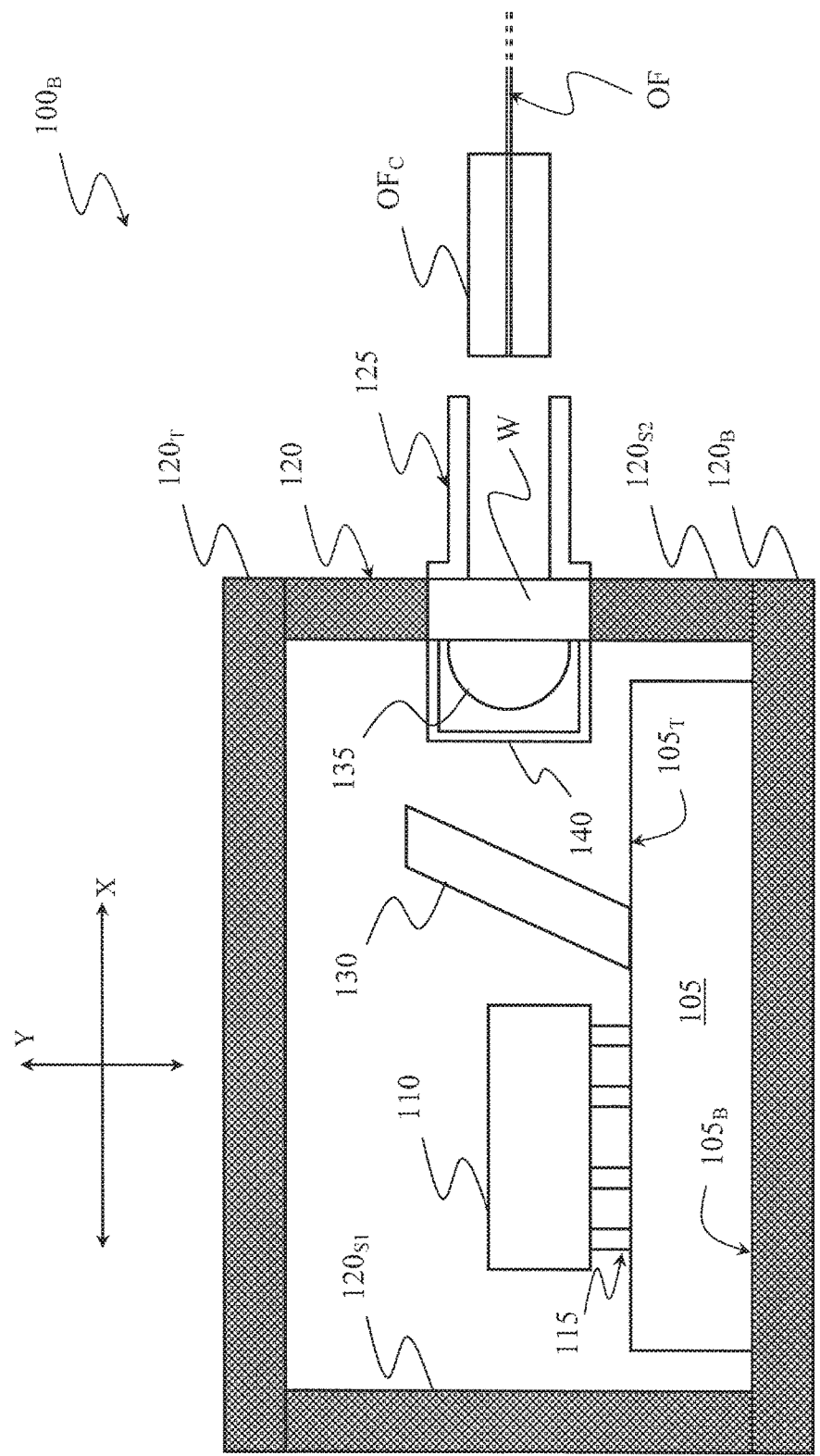

With particular reference to FIG. 1A, an optoelectronic device 100.sub.A according to an embodiment of the present disclosure is now described. The optoelectronic device 100.sub.A is suitable for use in optical communication systems where electrical signals containing information to be transmitted are modulated into corresponding optical signals. The optical signals are propagated through optical propagation channels. In the exemplary described embodiment, such optical propagation channels comprise optical fibers, such as the optical fiber OF, which the optoelectronic device 100.sub.A is adapted to be mechanically connected to for receiving/sending the optical signals (as will be discussed below)

For the sake of ease, in the following description, only elements of the optoelectronic device 100A deemed relevant for understanding the present embodiments will be introduced. In the following, directional terminology (for example, top, bottom, side, longitudinal, transverse) associated with such elements will be used only in connection with their orientation in the figures, and it will not be indicative of any specific orientation (between the various possible) such elements can be used. The term "substantially" will be used to take into account (desired or undesired) manufacturing tolerances.

The optoelectronic device 100A comprises a chip of semiconductor material 105 where optical circuits are integrated for modulating/de-modulating the electrical/optical signals into the corresponding optical/electrical signals, respectively. Although not shown, the OIC chip 105 comprises a waveguide for propagating the optical signals (between optical circuits integrated within it) along a longitudinal direction X (substantially parallel to a substrate of the OIC chip 105), an exposed region (on a main, for example, upper, surface 105T of the OIC chip 105) for sending/receiving the optical signals along a transverse direction Y (different from the longitudinal direction X, for example, substantially orthogonal thereto), and an optical grating for transferring the optical signals between the waveguide and the exposed region.

The optoelectronic device 100A comprises another chip of semiconductor material 110 where electronic circuits are integrated, hereinafter EIC ("Electronic Integrated Circuit") chip, for processing the electrical signals according to the specific functionality of the optoelectronic device 100A.

In order to allow the exchange of the electrical signals between the OIC chip 105 and the EIC chip 110, while maintaining a reduced volume occupation, the EIC chip 110 is electrically connected to the OIC chip 105 in "flip chip" mode. According to "flip-chip" connection mode, the EIC chip 110 is mounted upside down on the OIC chip 105, so that the corresponding terminals (not visible) are electrically connected to each other—directly, or, as shown in the figure, by way of intermediate coupling elements 115 (e.g., conductive bumps or pillars). The OIC chip 105 and the EIC chip 110 are housed, together with one or more optical components (discussed below), within a (e.g., hermetic or non-hermetic) package 120 of the optoelectronic device 100A.

More particularly, the package 120 comprises a bottom wall 120B that supports the OIC chip 105 on a rear surface 105B thereof opposite the upper surface 105T, a top wall 120T (facing the upper surface 105T and being parallel to the bottom wall 120B) that encloses the optoelectronic device 100A from above, and two reciprocally opposite side walls 120S1, 120S2 (between the upper wall 120T and the bottom wall 120B, transversely to them). As visible in the figure, portions free from optical components are provided within the package 120 (with such free portions that are occupied by air, as herein assumed, or by any other transmission medium with appropriate refractive index) to allow free space propagation of the optical signals.

Preferably, the bottom 120B, top 120T, and side 120S1, 120S2 walls of the package 120 are made of metal or ceramic material, with the exception of a portion of the side wall 120S2, which is provided with an optical window W made of a light-transparent material (e.g., glass, plastic or silicon) for the exchange (i.e., sending and receiving) of the optical signals between the optical fiber OF and the optoelectronic device 100A (when they are connected to each other). According to the exemplary embodiments of FIG. 1A (under discussion) and of FIGS. 1B-3B, 5 and 6 (discussed in the following), the optical window W is between (e.g., in the middle of) two walls portions of the side wall 120S2, whereas according to alternative embodiments (such as those illustrated in FIGS. 4A-4C, discussed in the following) the optical window is mounted directly on the upper surface of the OIC chip (with corresponding size reduction of the optoelectronic device).

Referring back to FIG. 1A, in order to allow connection to the optical fiber OF, the optoelectronic device 100A further comprises a housing 125 suitable for housing a connector OFC of the optical fiber OF. Preferably, the housing 125 is fixed (for example, glued or welded) on, and externally to, the side wall 120S2, in correspondence of the optical window W. In the exemplary embodiment, the housing 125 is arranged such that the connector OFC, when inserted into the housing 125, is located at a substantially central position with respect to the optical window W, and facing it. In other words, the exchange of the optical signals between the optical fiber OF and the optoelectronic device 100A (through the optical window W) takes place along the longitudinal direction X (in any case, as will be apparent from the remainder of the description, it can take place along different directions, not necessarily orthogonal to the transverse direction Y).

The optoelectronic device 100A further comprises optical components for converging the optical signals from the optical fiber OF to the OIC chip 105 and from the OIC chip 105 to the optical fiber OF. In the exemplary embodiments, such optical components comprise, between the optical window W and the EIC chip 110, optical deflection members 130 (e.g., an optical deflector) for deflecting the optical signals between the longitudinal direction X and the transverse direction Y, and, between the housing 125 and the optical deflector 130, optical focusing members (e.g., a system of, one or more, lenses) for focusing the optical signals along the longitudinal direction X. In other words, such optical components identify, between the connector OFC and the OIC chip 105, an optical path for the optical signals. Such optical path extends both internally to the optoelectronic device 100A (i.e., in the space delimited by the package 120), both externally thereto (i.e., in the space, external to the package 120, between the connector OFC and the optical window W).

The optical deflector 130, fixed on the OIC chip 105 by way of adhesive resins with appropriate refractive indices, deflects (e.g., by using a metalized deflecting surface thereof) the optical signals from the optical window W (along the longitudinal direction X) towards the exposed region of the OIC chip 105 (along the transverse direction Y), and vice versa. The orientation of the optical deflector 130 with respect to the upper surface 105T of the OIC chip 105, non-limiting for the present embodiments, can be chosen based on specific design considerations (for example, in order to ensure that the optical signals come to the exposed region, and hence to the optical grating, with the correct spot size). The lens system focuses the optical signals between the optical fiber OF and the optical deflector 130, and vice versa, thereby avoiding diffusion losses.

For example, in the embodiment illustrated in FIG. 1A, the lens system comprises a lens 135 (for example, made of glass, silicon or any other material transparent to the optical signals) fixed, for example glued, to the optical window W—anyway, nothing prevents from making the lens 135 in a single piece with the optical window W. In this way, the diffusion of the optical signals along the longitudinal direction X (between the optical fiber OF and the optical deflector 130) is reduced by the converging/focusing effect of the lens 135, and the propagation of the optical signals within the optoelectronic device 100A is allowed with very low (ideally zero) diffusion losses.

As mentioned above, the package 120 may be a non-hermetic package, in which case incoming humid air may cause refractive index changes (especially, at air/lens 135 interface), and hence errors in the propagation of the optical signals. In order to avoid that, an encasing structure 140 for encasing the lens 135 may be provided (as illustrated for the optoelectronic device 100B of FIG. 1B embodiment), so that an air gap between the encasing structure 140 and the lens 135 is defined as a result of the encasing. Due to the air gap, refractive index changes at air/lens 135 interface are substantially avoided, which allows optimal propagation of the optical signals. Preferably, the encasing structure 140 is made of a light-transparent material (e.g., glass, plastic or silicon), more preferably the encasing structure 140 is made of the same material as the optical window W, and even more preferably the encasing structure 140 is made in a single piece with the optical window W.

As should be readily understood, optoelectronic devices featuring hermetic packages may also benefit from the use of the encasing structure 140. Indeed, even when using hermetic packages, refractive index changes at air/lens 135 interface may arise due, for example, to optical components gluing.

Figure 2:
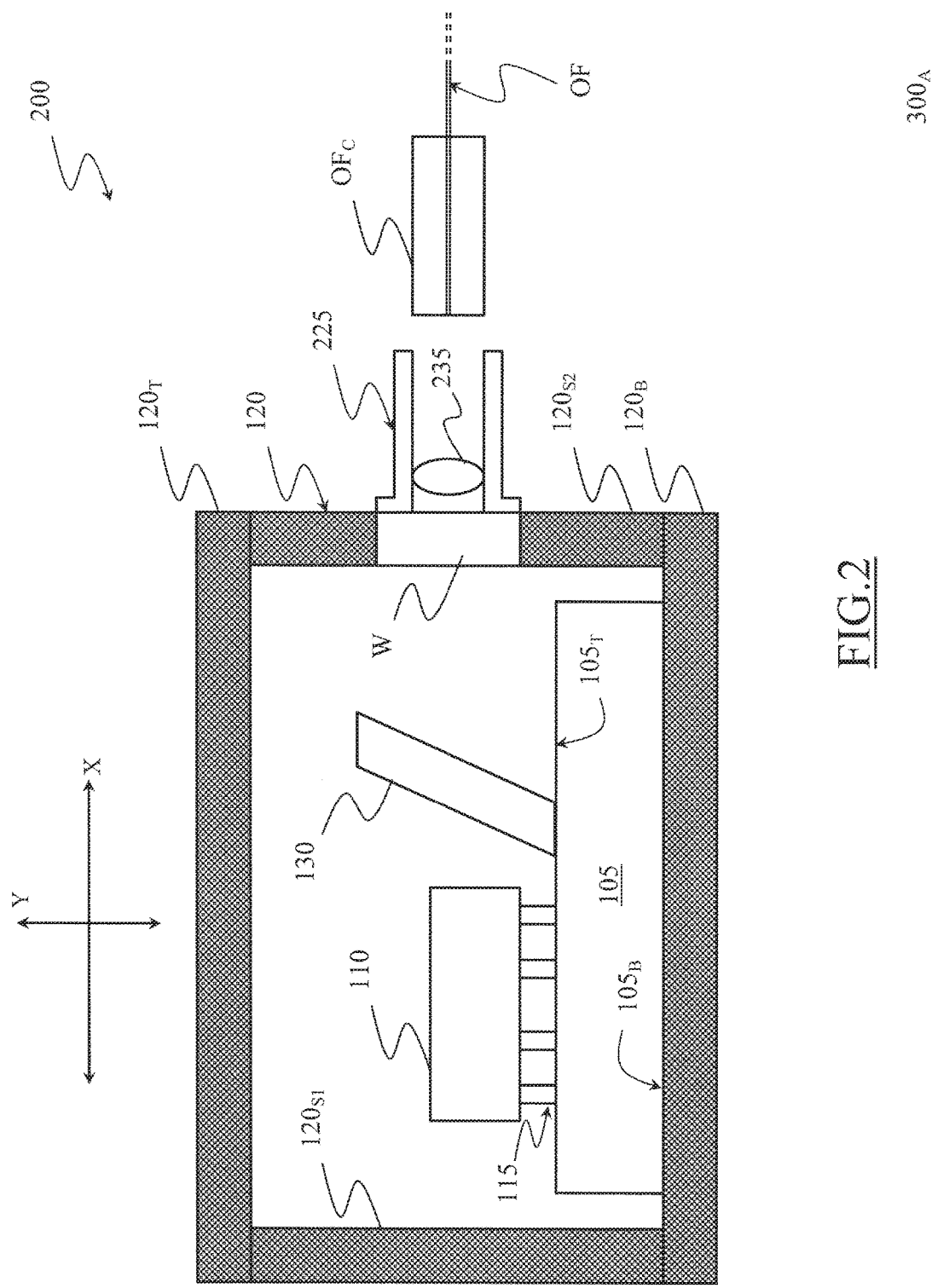

In the embodiment illustrated in FIG. 2, the lens system of the optoelectronic device 200 comprises a lens 235 integrated within the housing 225. For example, the lens 235 can be formed in a single piece with the housing 225, or it can be made separately and be fixed, for example, glued, within it. In order to improve the optical coupling between the optical fiber OF and the optical deflector 130, the lens system may comprise further lenses (or further optical components, for example, prisms, insulators) along the optical path. For example, in the embodiment illustrated in FIG. 3A, the optoelectronic device 300A comprises another lens 335, in addition to the lens 235, fixed (e.g., glued) on the OIC chip 105, between the optical deflector 130 and the optical window W—nothing prevents incorporating the lens 335 in the embodiments of FIGS. 1A-1B.

Figure 3A:
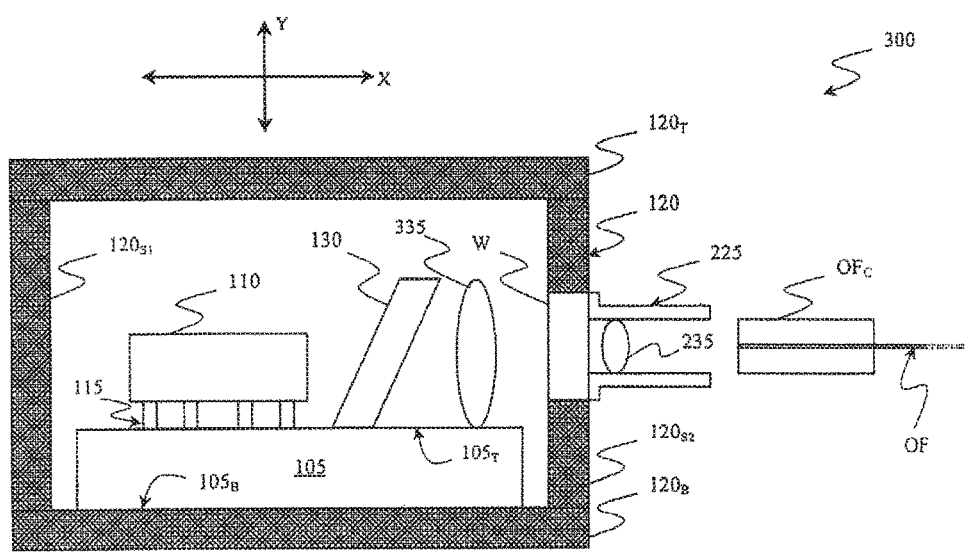
Figure 3B:
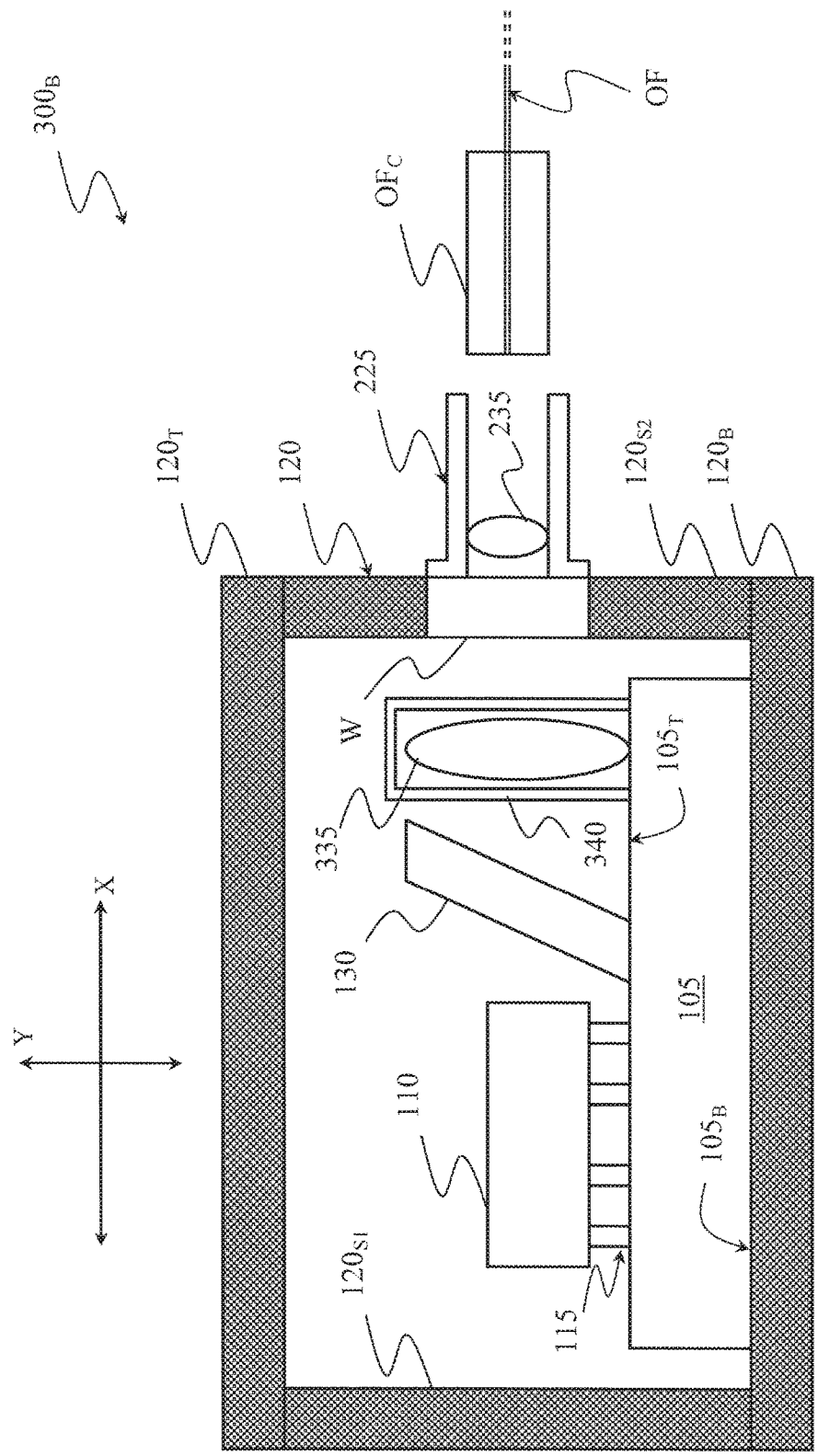

According to the embodiment illustrated in FIG. 3B, an encasing structure 340 (similar to the encasing structure 140) is provided for encasing the lens 335, so that an air gap between the encasing structure 340 and the lens 335 is defined as a result of the encasing. As mentioned above, according to other embodiments (illustrated in FIGS. 4A-4C), the optical window is mounted on the upper surface of the OIC chip, with the side wall 420S2 that is mounted on the optical window only (i.e., between the optical window and the top wall 120T of the package 420).

Figure 4A:
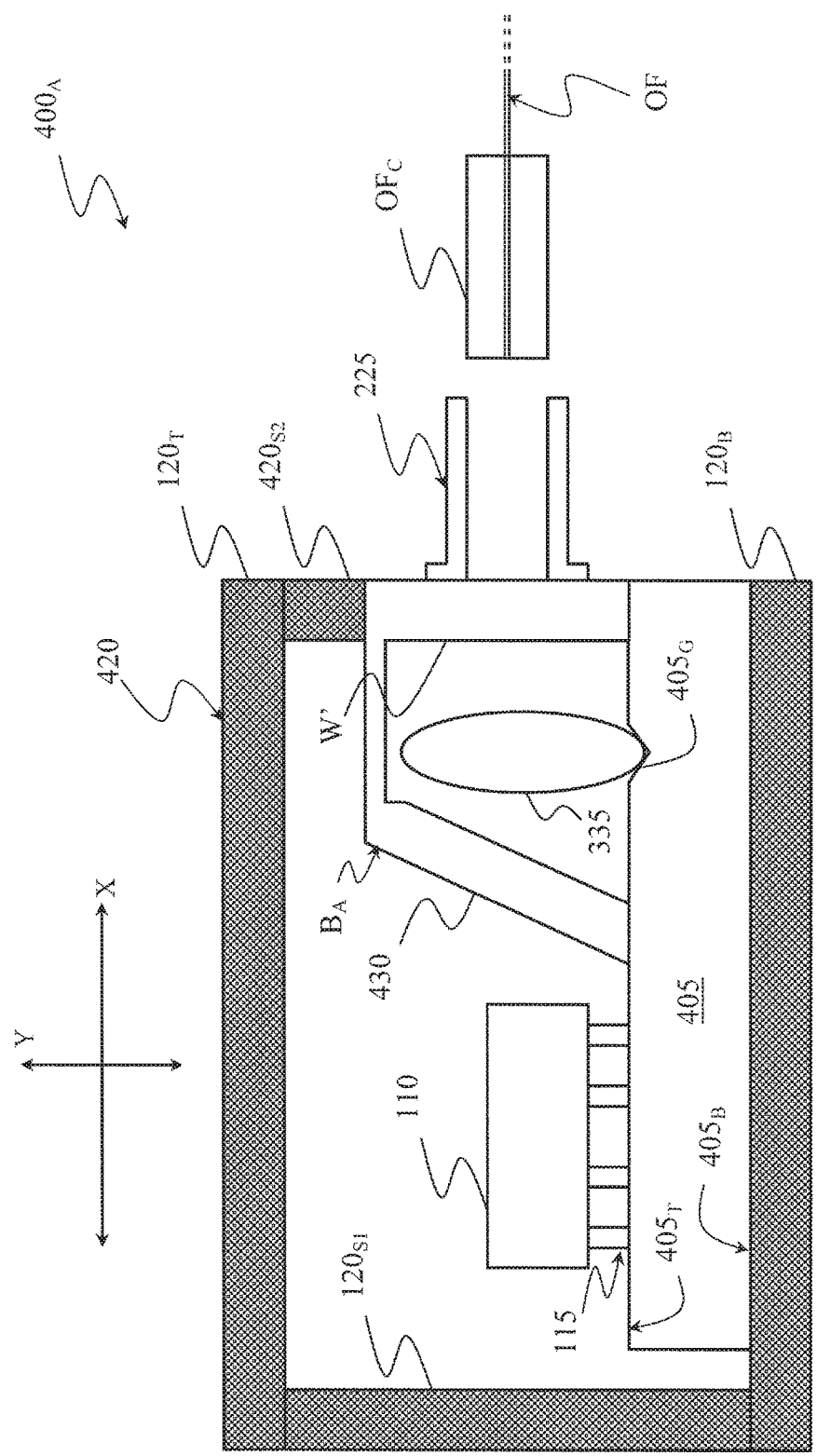
Figure 4B:
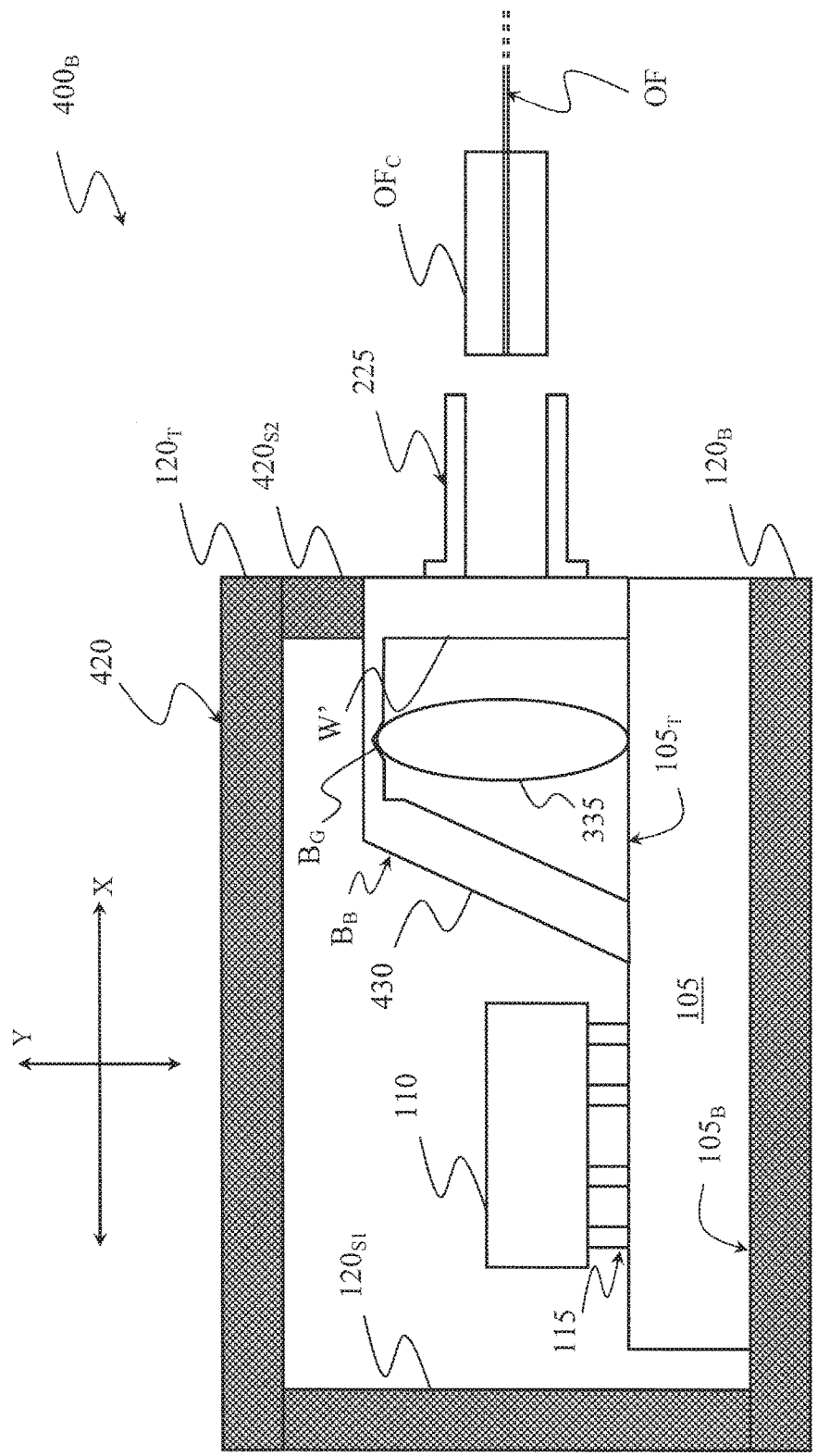

Preferably, as visible in FIG. 4A, the optical deflector 430 and the optical window W' are formed in a single body (globally denoted by the reference BA). The body BA, which is adapted to be mounted on the upper surface 405T of the OIC chip 405, is shaped so as to define an air gap between it and the main surface of the OIC chip 405, so that optimal propagation of the optical signals can be achieved—in other words, the body BA is functionally similar to the encasing structures 140,340, but additionally incorporates the optical deflector 430 and the optical window W'.

Preferably, the lens 335 is immersed in the air gap, covered and enclosed by the body BA—however, in alternative embodiments (not shown), no lens 335 is enclosed by the body BA (similarly to the FIG. 1A embodiment, wherein no lens is mounted on the upper surface 105T of the OIC chip 205, or to FIG. 2 embodiment, wherein the lens 235 is provided in the housing 225 only).

Preferably, a groove 405G for aligning and attaching the lens 335 is provided on the upper surface 405T of the chip 405 (as visible in FIG. 4A). Alternatively, as visible in FIG. 4B, a groove BG for aligning and attaching the lens 335 is provided on the body BG (preferably, as illustrated, at a horizontal wall thereof facing, and substantially parallel to, the upper surface 105T of the chip 105). In alternative embodiments (not shown), both grooves 405G, BG are provided. Attaching of the lens 335 to the groove 405G. BG is preferably achieved using a glue, which may be either an optical glue or a non-optical glue (e.g., a thixotropic glue).

Figure 4C:
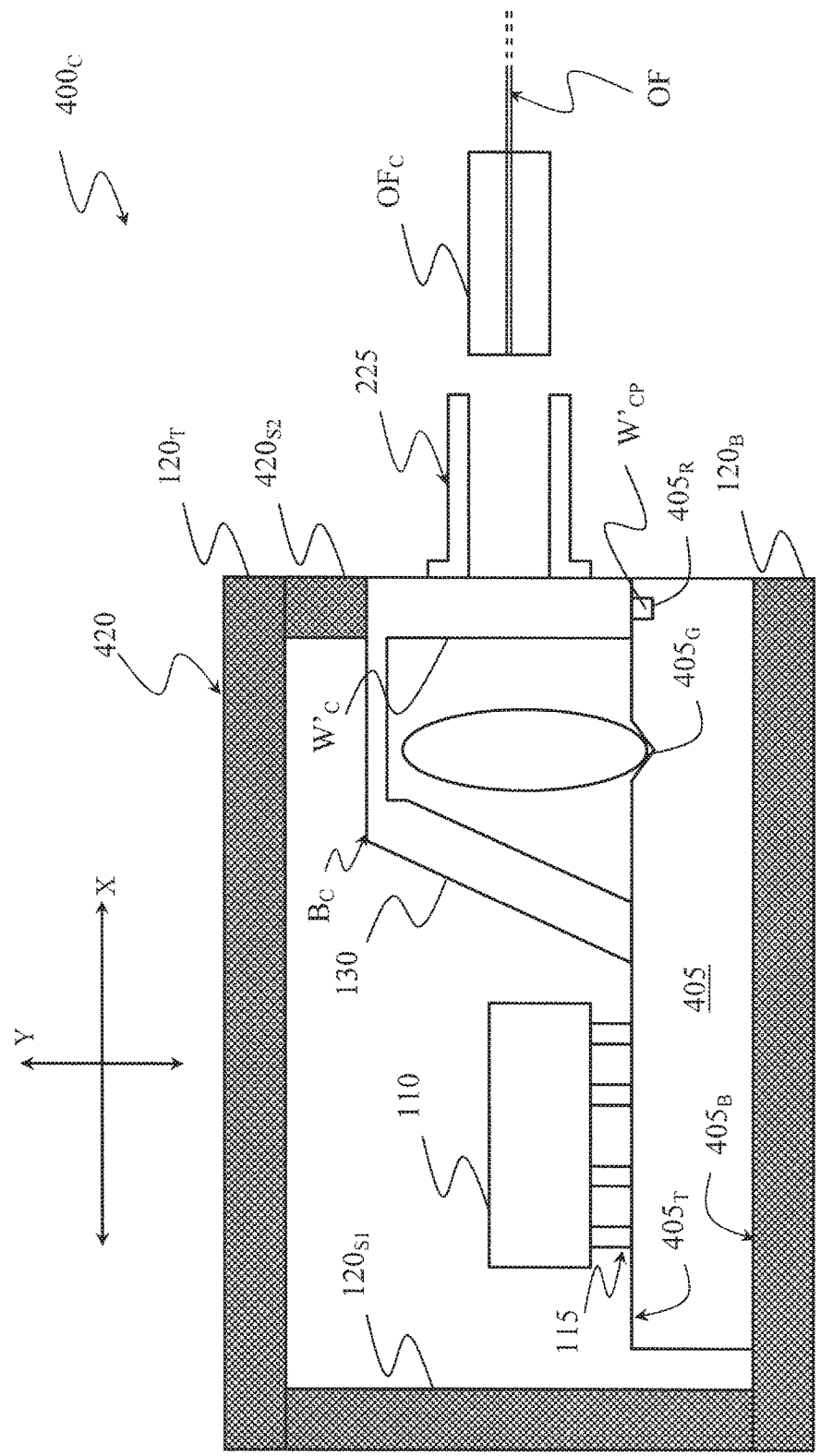

According to the embodiment illustrated in FIG. 4C, a recess 405R is provided on the upper surface 405T of the OIC chip 405 for receiving at least part of the optical window W'C thereto (e.g., a protruding part W'CP thereof), thus allowing aligning and attaching (e.g., using either an optical or non-optical glue) of the optical window W'C onto the chip 405. As should be understood, provision of the recess 405R may be independent from provision of the optical deflector 430 and of the optical window W'C in a single body BC (i.e., mounting of the optical window directly on the OIC chip, as well as a provision of the recess for facilitating it, may be implemented also in FIGS. 1A-3B and in FIGS. 5-6 embodiments).

Figure 5:
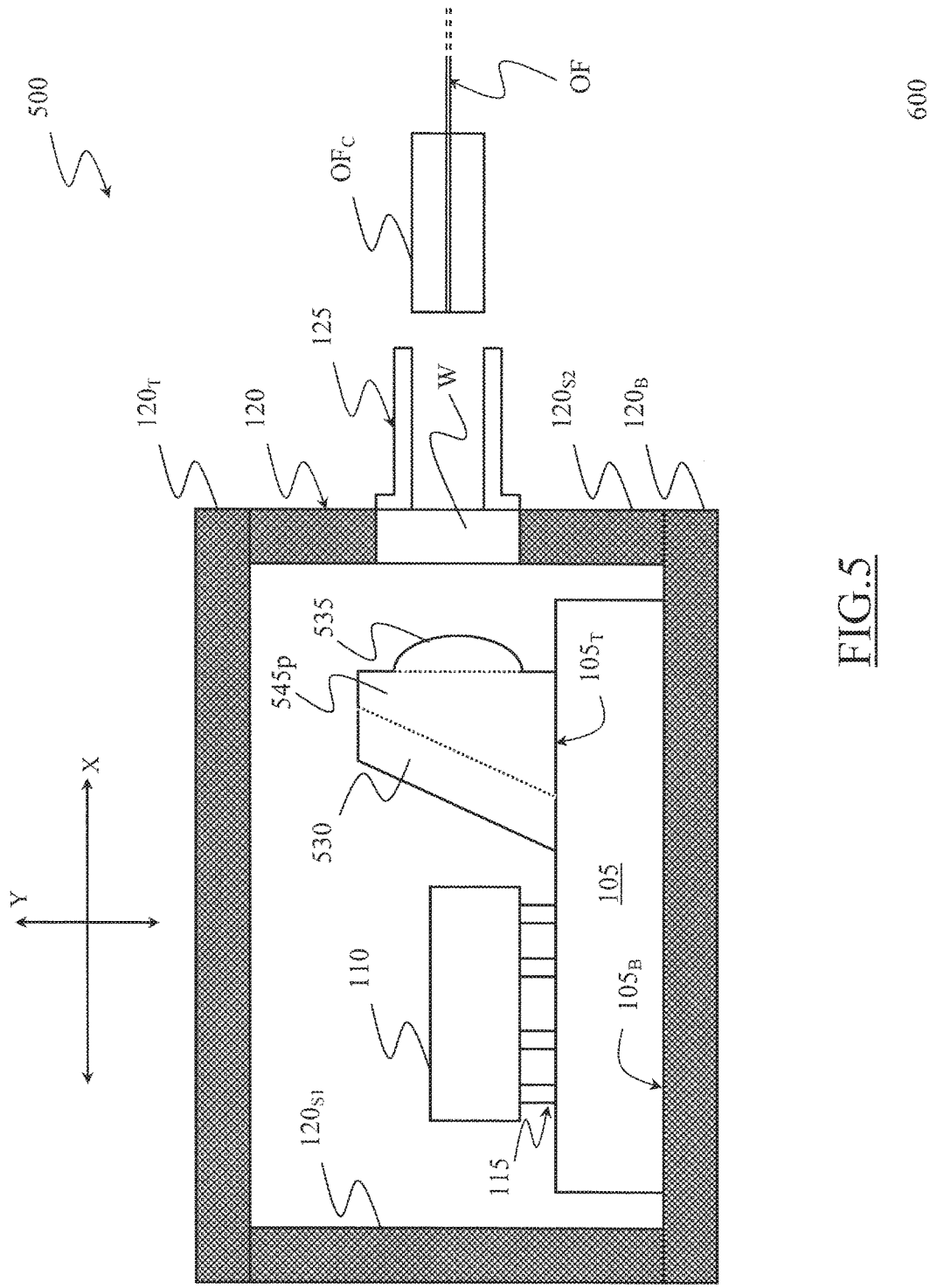
Figure 6:
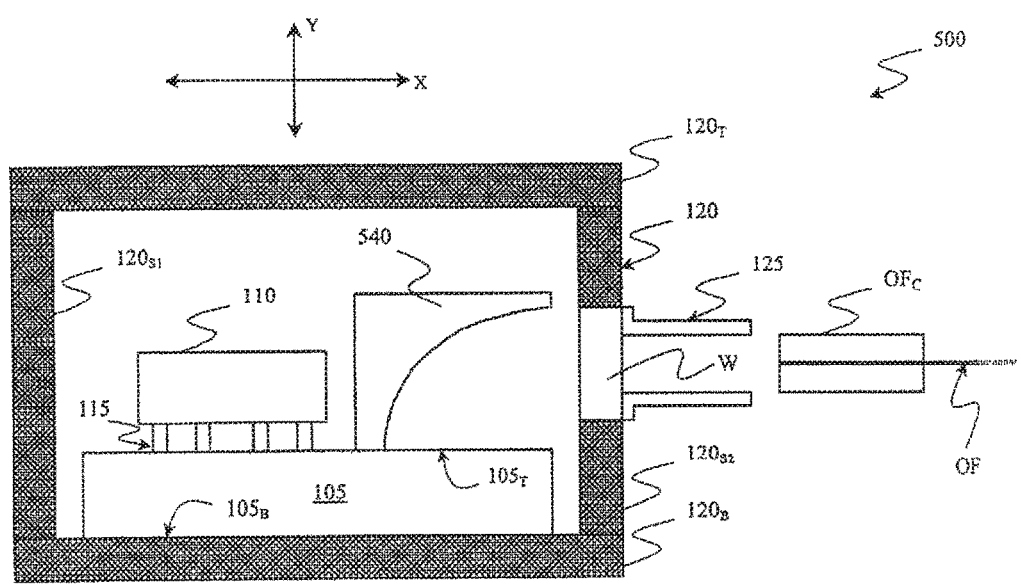

As will be understood, the optical deflector 130 and the lens 335 of the embodiments of FIGS. 1A-3B may be replaced by any equivalent optical component with similar deflecting and converging properties (as shown in FIGS. 5 and 6 embodiments, discussed below). For example, in the embodiment illustrated in FIG. 5, the optoelectronic device 500 comprises an optical deflector 530 (similar to the optical deflector 130), a lens 535 (similar to the lens 335), and a propagation portion 545P (between the optical deflector 530 and the optical lens 535) integrated in a single piece (for example, by typical molding techniques). In this way, the optical signals coming from the lens 535 converge, by propagating through the propagation portion 545P, towards the optical deflector 530 (and hence to the optical grating of the OIC chip 105), and vice versa. As will be understood, the optical deflector 530 and the lens 535 will have, by virtue of the optical characteristics of the propagation portion 545P, different design parameters with respect to those of the optical deflector 130 and of the lens 335 (e.g., size and inclination of the optical deflector 530, size and focal length of the lens 535, and distance between the optical deflector 530 and the lens 535—i.e., size of the propagation portion 545P). The described approach is advantageous in that the making of the optical deflector 530 and of the lens 535 in a single piece avoids mutual misalignments that may cause degradation of the optical signals.

Although the optical deflector 530/lens 535/propagation portion 545P assembly shown in FIG. 5 comprises a solid propagation portion 545P, this should not be understood to be limiting. In fact, nothing prevents a propagation portion being internally hollow (not shown) that connects the optical deflector 530 and the lens 535 to each other, so that the optical signals coming from the lens 535 converge towards the optical deflector 530 by propagating through the air (similarly to FIG. 3A embodiment).

In the embodiment illustrated in FIG. 6, however, the optoelectronic device 600 comprises, instead of optical lenses and deflectors on the OIC chip 105, a curved mirror 650, for example, concave. By suitably sizing the curvature of the curved mirror 650, and by placing it with the concave portion facing the optical window W at an appropriate distance, the optical signals from the optical window W, after propagating through the air, hit the surface of the curved mirror 650, and are deflected and focused towards the (exposed region of) OIC chip 105 in a similar way as described in the previous embodiments.

As will be understood, the embodiments of FIGS. 5 and 6 may be used in the optoelectronic devices of FIGS. 1A-4C, additionally or alternatively to at least part of the optical components illustrated therein. For example, although not shown, nothing prevents making the optical deflector 530/lens 535/propagation portion 545P assembly, or the curved mirror 650, in a single body with the optical window (with such an optical window that may be of the types illustrated in FIGS. 4A-4C).

Turning to FIGS. 7A-7D, some steps of the production process of the optoelectronic device 100A according to an embodiment are now described. As will be understood, such production process, described here in detail in connection with the optoelectronic device of a specific embodiment of the present disclosure, can be applied in a similar manner also for the other described embodiments (and those having reference to them), with obvious and evident changes. Considering in particular FIG. 7A, the production process starts with the mounting of the OIC chip 105 on the bottom wall 120B, and with the "flip chip" mounting of the EIC chip 110 on the OIC chip 105. As visible in the figure, in this phase the package is not yet completed (so as to facilitate the following positioning/alignment and mounting of the optical components).

Figure 7A:
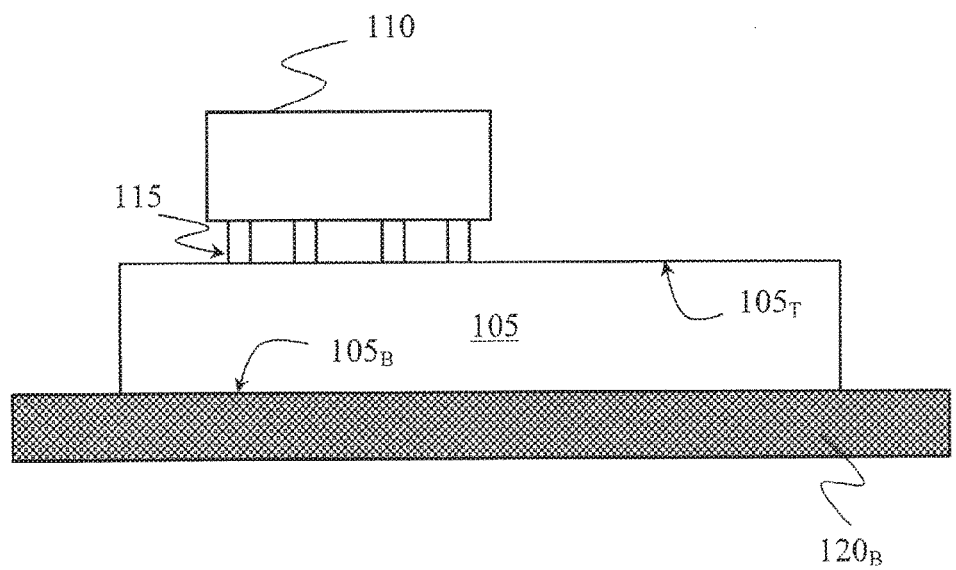
FIGS. 7A-7D are schematic diagrams of steps of the production process of the optoelectronic device of FIG. 1A.
Figure 7B:
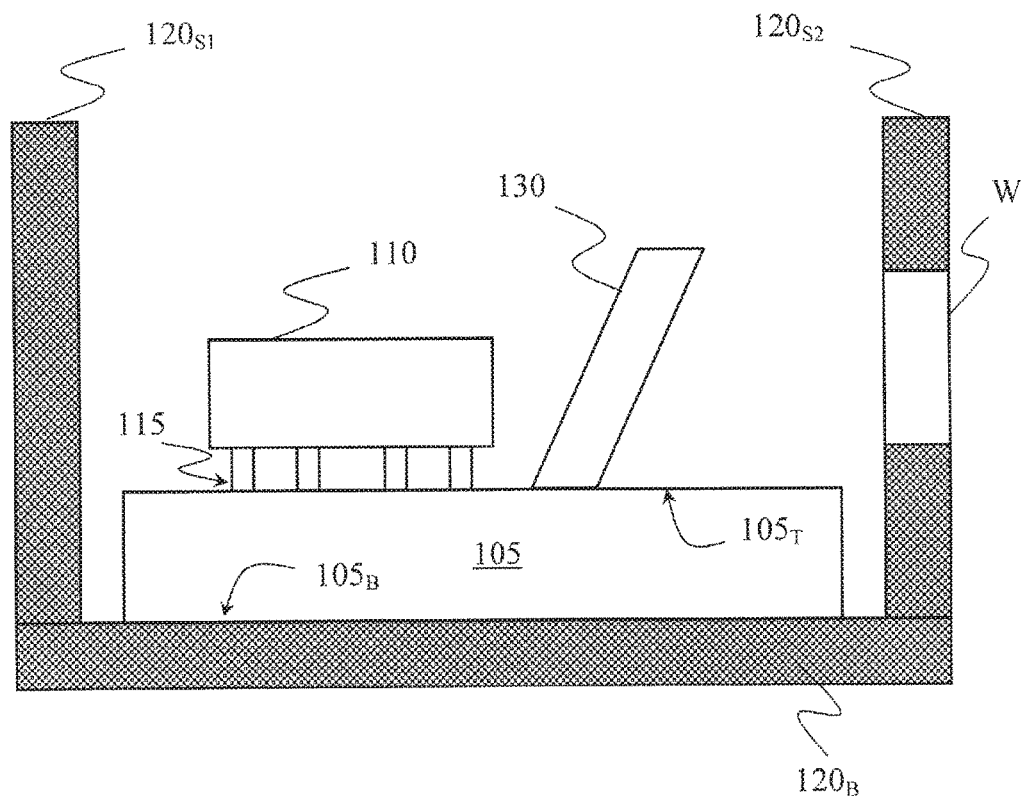
Figure 7C:
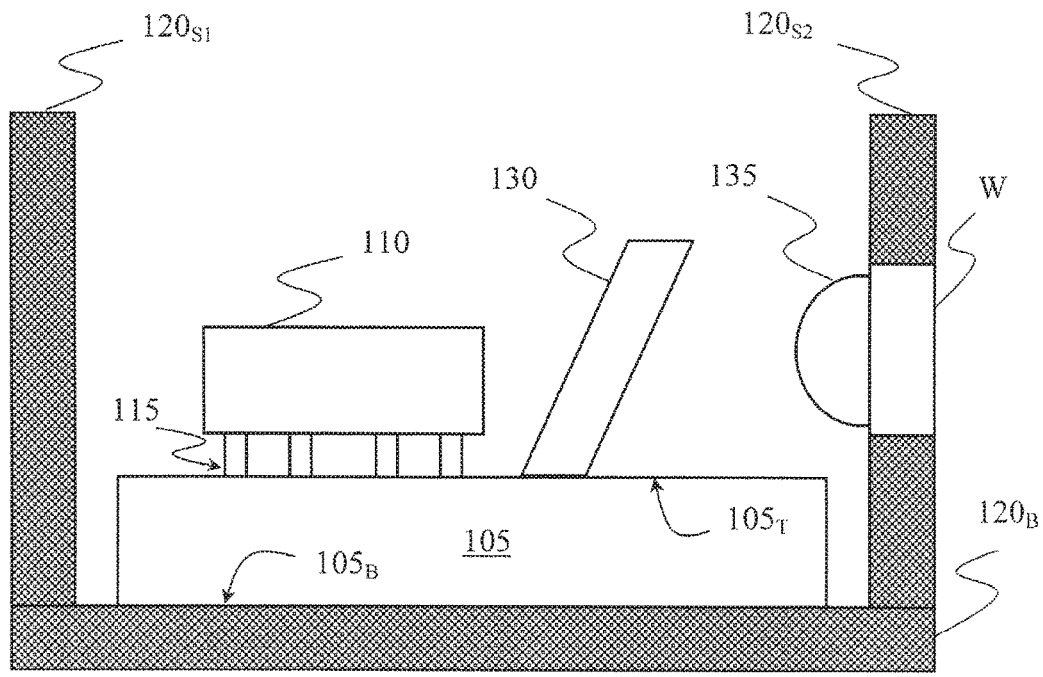

Turning now to FIG. 7B, the optical deflector 130 is positioned and mounted on the bottom wall 120B. The side walls 120S1, 120S2 (i.e., terminal portions thereof) are then fixed (for example, glued or welded) on opposite edge regions of the bottom wall 120B. The positioning of the optical deflector 130, made automatically by typical tools, may take place in active mode (i.e., with positioning control feedback), or in passive mode (i.e., without positioning control feedback). The use of the active mode (which allows achieving more accurate positioning/alignment) or of the passive mode (which allows achieving faster positioning/ alignment) can be chosen on the basis of appropriate design considerations (e.g., tolerances of the optical components and of their mutual alignment, desired accuracy on the basis of the specific application where the optoelectronic device is intended to be used, and/or size of the optoelectronic device). Subsequently, the lens 135 is positioned (in active mode or in passive mode) and fixed, for example, glued, on the optical window W (FIG. 7C)—with such step that can be omitted in the case that the lens 135 and the optical window W are formed in a single piece.

Figure 7D:
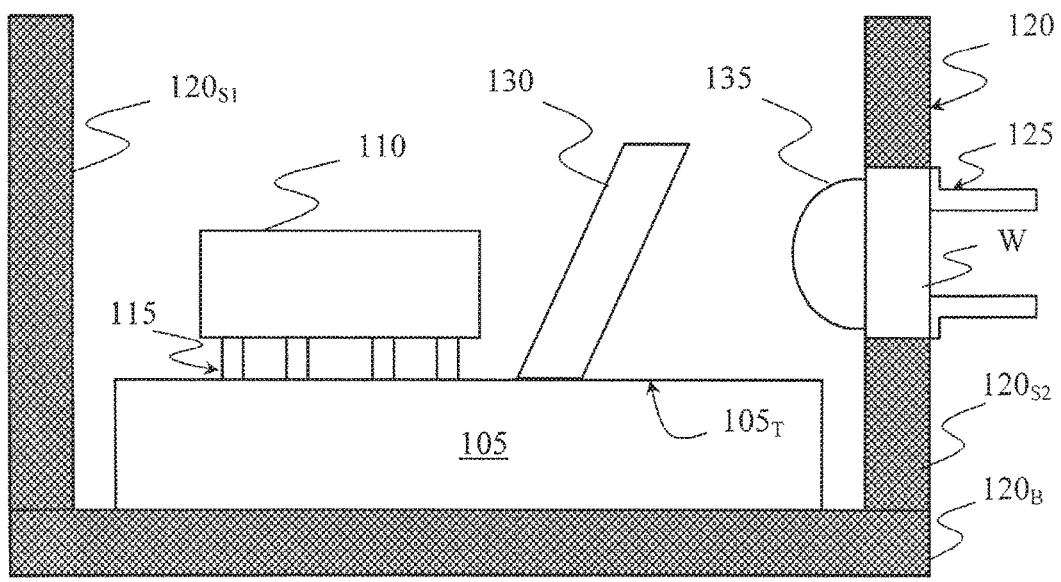

At this point, as shown in FIG. 7D, the housing 125 is positioned (in active mode or in passive mode) and fixed, for example, glued or welded, outside the optical window W. Finally, the top wall 120T is fixed on the side walls 120S1, 12052 (i.e., on free end portions thereof, opposite the end portions fixed to the bottom wall 120B), thereby obtaining the optoelectronic device illustrated in FIG. 1.

Naturally, in order to satisfy local and specific requirements, a person skilled in the art may apply to the approach described above many logical and/or physical modifications and alterations. More specifically, although this approach has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical examples) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed approach may be incorporated in any other embodiment as a matter of general design choice.

For example, an aspect of the approach according to embodiments of the present disclosure proposes an optoelectronic device. The optoelectronic device comprises a package having means or a component for sending/receiving optical signals along a first direction, and a chip of semiconductor material housed within the package. The chip has a main surface and means exposed on the main surface for sending/receiving the optical signals along a second direction different from the first direction. The optoelectronic device further comprises means or a component for deflecting the optical signals between the first direction and the second direction, the component being mounted on the main surface.

Similar considerations apply if the optoelectronic device has a different structure or comprises equivalent components, or has other operating features. In any case, any component thereof can be separated into more elements, or two or more components can be combined in a single element. In addition, each component may be replicated to support the execution of the corresponding operations in parallel. It is also pointed out that (unless specified otherwise) any interaction between different components generally does not need to be continuous, and may be direct or indirect through one or more intermediaries.

For example, the component for deflecting the optical signals between the first direction and the second direction can be mounted directly on the main surface (as shown in the discussed embodiments), or indirectly (for example, by coupling layers with appropriate refractive indices). In addition, shape, size and proportions of the package are not limiting for the present disclosure, and can be chosen according to appropriate design considerations. According to an embodiment of the present disclosure, the second direction is substantially orthogonal to the main surface, and the first direction is substantially orthogonal to the second direction. However, depending on the specific implementation of the OIC chip (and in particular of the optical grating and of the exposed region thereof), the second direction may have an angle between 70.degree. and 110.degree. with respect to the main surface (in any case, these values, which mainly depend on the technology currently available for the making of the optical gratings, are not limiting for the present disclosure). Moreover, depending on the specific implementation of the package, the first direction can be non-orthogonal with respect to the second direction.

According to an embodiment, the package comprises a first wall for supporting the chip on a rear surface opposite to the main surface, a second wall facing the main surface, and a third wall between the first wall and the second wall. The component is for sending/receiving optical signals along a first direction comprising an optical window in at least one portion of the third wall.

The component for sending/receiving signals may comprise only an opening in the third wall (i.e., the side wall). Furthermore, although not shown, multiple optical windows (or openings) may be provided. In addition, the optical window can have any shape and/or size. Moreover, nothing prevents from making optical windows and/or openings distributed on different package walls (for example, on both side walls).

According to an embodiment, the optical window is made of a light-transparent plastic or glass material. According to an embodiment, the optical window is mounted on the main surface of the chip. According to an embodiment, the optoelectronic device further comprises a recess on the main surface of the chip for receiving at least part of the optical window thereto thereby allowing aligning and attaching of the optical window onto the chip. According to an embodiment, the optoelectronic device further comprises a housing or housing means for guided optical propagation of the optical signals, the housing being mounted on the optical window.

In this regard, although in the description explicit reference has been made to an optical fiber, this should not be understood to be limiting. In fact, the method of guided optical propagation may comprise any type of optical waveguide (single-mode or multi-mode). Furthermore, although the housing and the connector have been shown by schematic representations, it should be understood that shape and size thereof (as well as the specific design features necessary for their connection, not herein discussed) are not to be construed to be limiting.

In addition, nothing prevents from positioning the housing staggered with respect to the optical window. In this case, further optical deflectors (and/or other optical components with deflecting features) may be provided for deflecting the optical signals towards the optical window.

According to an embodiment, the optoelectronic device further comprises means or a component for focusing the optical signals along the first direction. According to an embodiment, the component for focusing the optical signals along the first direction is mounted on the main surface.

Similarly to what discussed above, the component for focusing the optical signals can be mounted directly on the main surface (as shown in the discussed embodiments), or indirectly (for example, by coupling layers with appropriate refractive indices). Additionally or alternatively, they (or a part thereof) can be fixed to the optical window or to the housing.

According to an embodiment, the optoelectronic device further comprises an encasing structure for encasing the component for focusing the optical signals, so that an air gap between the encasing structure and the component for focusing the optical signals is defined as a result of the encasing. Also, the encasing structure may also be omitted in a basic implementation.

According to an embodiment, the component for focusing the optical signals along the first direction and the component for deflecting the optical signals between the first direction and the second direction are formed in a single piece. In such case, as discussed in the description, a (solid or internally hollow) intermediate propagation portion may be provided.

As will be understood, the making in a single piece does not necessarily imply that the component for deflecting (for example, the optical deflector), the component for focusing (for example, the lens) and the intermediate propagation portion are to be formed in a same material. According to an embodiment, at least part of the component for focusing the optical signals along the first direction is formed in the housing.

As above mentioned, one or more lenses can be made in a single piece with the housing (not necessarily with the same material), or they may be implemented separately and mounted at a later stage. According to an embodiment, at least part of the component for focusing the optical signals along the first direction is fixed to the optical window.

Although in the description explicit reference has been made to a lens directly mounted on (or integrated to) the optical window within the package, this should not be understood to be limiting. In fact, additionally or alternatively, the lens, or one or more further lenses, can be mounted on (or integrated to) the optical window outside the package.

According to an embodiment, the component for deflecting the optical signals and the optical window is formed in a single body. The body may further comprise a groove for aligning and attaching the component for focusing the optical signals thereto. According to an embodiment, the optoelectronic device further comprises a groove on the main surface of the chip for aligning and attaching the component for focusing the optical signals thereto. According to an embodiment, the component for focusing the optical signals is attached to the groove by way of a glue, such as an optical glue or a thixotropic glue. The body may be shaped so as to define an air gap between it and the main surface of the chip, the component for focusing the optical signals being immersed in the air gap. According to an embodiment, the component for deflecting the optical signals may comprise a metalized deflecting surface.

Another aspect is directed to a method for making an optoelectronic device. The method comprises the steps of forming a package having means or a component for sending/receiving optical signals along a first direction, housing a chip of semiconductor material in the package, the chip having a main surface and means exposed on the main surface for sending/receiving the optical signals along a second direction different from the first direction, and mounting, on the main surface, means or a component for deflecting the optical signals between the first direction and the second direction.

The approach according to an embodiment of the present disclosure lends itself to be implemented through an equivalent method (by using similar steps, removing some nonessential steps, or adding additional optional steps). Moreover, the steps may be performed in a different order, in parallel or overlapped (at least in part).

What is claimed is:

1. A method for making an optoelectronic device comprising:
    mounting an electronic integrated chip onto an optical integrated circuit that is supported by a bottom wall of a housing, the optical integrated circuit comprising a main surface;
    mounting an optical deflector on the main surface of the optical integrated circuit;
    attaching sidewalls on opposite edge regions of the bottom wall of the housing, wherein a first sidewall of the sidewalls comprises an optical window to send/receive optical signals along a first direction, and wherein the main surface of the optical integrated circuit includes an optical grating to send/receive optical signals along a second direction different from the first direction;
    positioning a focusing lens to focus the optical signals to/from the optical window;
    enclosing the focusing lens with an enclosure to include an air gap between the enclosure and the focusing lens; and
    attaching a top wall to the sidewalls so as to form the housing that encloses the electronic integrated chip and the optical integrated circuit, wherein, after the attaching, along the second direction, an outer surface of the enclosure is spaced from an internal surface of the top wall facing the main surface of the optical integrated circuit by a first fixed distance.

2. The method according to claim 1, wherein the second direction is substantially orthogonal to the main surface, and wherein the first direction is substantially orthogonal to the second direction.

3. The method according to claim 1, wherein the optical window comprises a transparent material.

4. The method according to claim 1, further comprising providing a recess in the first sidewall for the optical window.

5. The method according to claim 1, further comprising coupling a connector housing to the optical window to provide propagation of the optical signals.

6. The method according to claim 1, wherein positioning the focusing lens comprises mounting the focusing lens on the main surface.

7. The method according to claim 1, further comprising providing a groove configured to align and position the focusing lens.

8. The method according to claim 1, wherein the main surface comprises a groove configured to align and position the focusing lens.

9. The method according to claim 8, wherein the focusing lens is coupled to the groove with an optical adhesive material.

10. The method according to claim 1, wherein, after the attaching, along the first direction, the outer surface of the enclosure is spaced from an internal surface of the optical window by a second fixed distance.

11. The method according to claim 1, wherein mounting the electronic integrated chip onto the optical integrated circuit comprises flip-chip mounting.

12. A method for making an optoelectronic device comprising:
mounting an electronic integrated chip onto an optical integrated circuit that is supported by a bottom wall of a housing, the optical integrated circuit comprising a main surface;
attaching sidewalls on opposite edge regions of the bottom wall of the housing, wherein a first sidewall of the sidewalls comprises an optical window to send/receive optical signals along a first direction, and wherein the main surface of the optical integrated circuit includes an optical grating to send/receive optical signals along a second direction different from the first direction;
mounting an optical deflector on the main surface of the optical integrated circuit;
positioning a focusing lens to focus the optical signals to/from the optical window;
providing a propagation portion configured to propagate the optical signals from the optical deflector and the focusing lens, wherein the optical deflector, the focusing lens, and the propagation portion are integrated in a single monolithic piece, wherein the single monolithic piece comprises a curved outer surface facing the optical window; and
attaching a top wall to the sidewalls so as to form the housing that encloses the electronic integrated chip and the optical integrated circuit.

13. The method of claim 12, wherein the curved outer surface comprises a curved mirror facing the optical window.

14. The method of claim 12, wherein the curved outer surface comprises a convex outer surface facing the optical window.

15. The method of claim 12, further comprising attaching an additional lens aligned to the optical window outside the housing.

16. The method of claim 12, further comprising attaching a connector housing to an outer surface of the housing.

17. A method for making an optoelectronic device comprising:
mounting an electronic integrated chip onto an optical integrated circuit that is supported by a bottom wall of a housing, the optical integrated circuit comprising a main surface;
attaching sidewalls on opposite edge regions of the bottom wall of the housing, wherein a first sidewall of the sidewalls comprises an optical window to send/receive optical signals along a first direction, and wherein the main surface of the optical integrated circuit includes an optical grating to send/receive optical signals along a second direction different from the first direction;
mounting an optical deflector on the main surface of the optical integrated circuit;
positioning a focusing lens to focus the optical signals to/from the optical window;
providing a propagation portion configured to propagate the optical signals from the optical deflector and the focusing lens, wherein the optical deflector, the focusing lens, and the propagation portion are integrated in a single monolithic piece;
attaching a top wall to the sidewalls so as to form the housing that encloses the electronic integrated chip and the optical integrated circuit; and
attaching an additional lens aligned to the optical window outside the housing.

18. The method of claim 17, wherein the single monolithic piece comprises a curved mirror facing the optical window.

19. The method of claim 17, wherein the single monolithic piece comprises a convex outer surface facing the optical window.

20. The method of claim 17, further comprising attaching a connector housing to an outer surface of the housing.

21. The method of claim 17, further comprising enclosing the focusing lens with an enclosure to include an air gap between the enclosure and the focusing lens.

* * * * *